United States Patent [19]

Ito et al.

[11] Patent Number: 5,374,131
[45] Date of Patent: Dec. 20, 1994

[54] PRINTER CAPABLE OF SPACING CHARACTERS WITHIN FRAME

[75] Inventors: Chitoshi Ito, Kasugai; Minako Ishida, Ama; Satomi Otsuka, Konan; Shoji Sakuragi, Nagoya; Sachiyo Nagase, Nishikasugai, all of Japan

[73] Assignee: Brother Kogyo Kabushiki Kaisha, Nagoya, Japan

[21] Appl. No.: 67,142

[22] Filed: May 26, 1993

[30] Foreign Application Priority Data

Jun. 1, 1992 [JP] Japan ................................ 4-166966
Jun. 17, 1992 [JP] Japan ................................ 4-184346

[51] Int. Cl.⁵ .............................................. B41J 19/14
[52] U.S. Cl. ........................................ 400/76; 400/9; 400/17
[58] Field of Search ................ 400/17, 21, 61, 76, 400/306, 1, 3, 9, 10

[56] References Cited

U.S. PATENT DOCUMENTS 4,623,418 11/1986 Gombrich et al. .................. 400/17
4,906,114 3/1990 Tanaka et al. ...................... 400/17

FOREIGN PATENT DOCUMENTS 248651 10/1987 Japan .................................... 400/76
2-133865 5/1990 Japan .................................... 400/17
2-133866 5/1990 Japan .................................... 400/17
2120821 12/1983 United Kingdom .................. 400/17
2233800 1/1991 United Kingdom .................. 400/17

Primary Examiner—David A. Wiecking
Assistant Examiner—Steven S. Kelley
Attorney, Agent, or Firm—Oliff & Berridge

[57] ABSTRACT

A printer capable of printing characters within a frame is disclosed. In such printer, when the frame start key on the keyboard is depressed, the frame start code data is inserted in the text memory and when the frame terminating key on the keyboard is depressed, the frame terminating code data is inserted in the text memory. Thereafter, according to depressing of the print key, the frame spaces are formed at both the frame start code data and the frame terminating code data. And the frame start point and the frame terminating point are respectively set to the frame space corresponding to the frame start code data and the frame space corresponding to the frame terminating code data. Further, the image data of the character code data stored in the text memory is prepared, and at the same time, the image data of the frame is prepared according to the frame start point and the frame terminating point. At that time, the image data of the frame is prepared so that the frame spaces are included within the frame. Further, the image data is printed on a film tape by the thermal head. As a result, the tape on which the characters are printed without contacting the frame can be obtained.

14 Claims, 28 Drawing Sheets

FIG. 5 (B)

| STEP No. | INSTRUCTION |
|---|---|
| S1 | INITIALIZATION |
| S2 | KEY INPUT ? |
| S3 | PRINT KEY ? |
| S4 | FRAME START KEY ? |
| S5 | FRAME TERMINATING KEY ? |
| S6 | ITALIC START KEY ? |
| S7 | ITALIC TERMINATING KEY ? |
| S8 | CHARACTER KEY ? |
| S9 | PROCESS CORRESPONDING TO THE INPUT KEY IS CONDUCTED |
| S10 | PRINTING PROCESS |
| S11 | FRAME START CODE DATA IS STORED |
| S12 | FRAME TERMINATING CODE DATA IS STORED |
| S13 | ITALIC START CODE DATA IS STORED |
| S14 | ITALIC TERMINATING CODE DATA IS STORED |
| S15 | CHARACTER CODE DATA IS STORED |

FIG. 6 (B)

| STEP No. | INSTRUCTION |
|---|---|
| S16 | BACK·UP PROCESS IS EXECUTED |
| S17 | PROCESS FOR INSERTING FRAME SPACES IS CONDUCTED |
| S18 | PROCESS FOR INSERTING ITALIC SPACES IS CONDUCTED |
| S19 | TEXT DATA WITH FRAME SPACES AND THE ITALIC SPACES IS CONVERTED INTO IMAGE DATA |
| S20 | IMAGE DATA IS PRINTED |
| S21 | TEXT DATA IS CLEARED AND RESTORED |

| STEP No. | INSTRUCTION |
|---|---|
| S22 | INITIALIZATION |
| S23 | FRAME START CODE DATA IS SEARCHED IN TEXT MEMORY |
| S24 | JUDGED WHETHER FRAME START CODE DATA EXISTS IN TEXT MEMORY |
| S25 | TEXT POINTER IS SET TO LINE HEAD |
| S26 | FRAME TERMINATING CODE DATA IS SEARCHED IN TEXT MEMORY |
| S27 | TEXT POINTER IS SET TO LINE END |
| S28 | JUDGED WHETHER BOTH FRAME START CODE DATA AND FRAME TERMINATING CODE DATA ARE IN SAME LINE |
| S29 | INSERTING PROCESS OF FRAME SPACES IN CASE OF SINGLE LINE IS CONDUCTED |
| S30 | TEXT POINTER IS SET TO NEXT POINT AFTER FRAME TERMINATING CODE DATA |
| S31 | JUDGED WHETHER BOTH FRAME START CODE DATA AND FRAME TERMINATING CODE DATA ARE IN SAME BLOCK |
| S32 | INSERTING PROCESS OF FRAME SPACES IN CASE OF PLURAL LINES IS CONDUCTED |
| S33 | INSERTING PROCESS OF FRAME SPACES IN CASE OF PLURAL BLOCKS IS CONDUCTED |

| STEP No. | INSTRUCTION |
|---|---|
| S34 | TWO FRAME SPACES ARE INSERTED BEFORE AND AFTER FRAME START CODE DATA |
| S35 | TWO FRAME SPACES ARE INSERTED BEFORE AND AFTER FRAME TERMINATING CODE DATA |
| S36 | FRAME START POINT IS SET TO FRAME SPACE AFTER FRAME START CODE DATA |
| S37 | FRAME TERMINATING POINT IS SET TO FRAME SPACE BEFORE FRAME TERMINATING CODE DATA |

FIG. 9 (B)

| STEP No. | INSTRUCTION |
|---|---|
| S38 | TEXT POINTER IS SET TO FRAME START CODE DATA |
| S39 | TWO FRAME SPACES ARE INSERTED BOTH LINE HEAD AND LINE END |
| S40 | TEXT POINTER IS SHIFTED TO NEXT LINE |
| S41 | JUDGED WHETHER FRAME TERMINATING CODE DATA IS IN LINE |
| S42 | JUDGED WHETHER BLOCK CODE DATA IS IN LINE |
| S43 | FRAME SPACES ARE INSERTED AT BOTH LINE HEAD AND LINE END |
| S44 | FRAME START POINT IS SET TO FRAME SPACE INSERTED AT LINE HEAD |
| S45 | FRAME TERMINATING POINT IS SET TO FRAME SPACE INSERTED IN LINE END |

FIG. 10(B)

| STEP No. | INSTRUCTION |
|---|---|
| S46 | INITIALIZATION |
| S47 | INSERTING PROCESS OF FRAME SPACES IN CASE OF PLURAL PRINTING LINES IS CONDUCTED |
| S48 | PROCEDURE IS SHIFTED TO NEXT BLOCK |
| S49 | JUDGED WHETHER FRAME TERMINATING CODE IS IN BLOCK |
| S50 | INSERTING PROCESS OF FRAME SPACES IN CASE OF PLURAL PRINTING LINES IS CONDUCTED |

FIG. 11 (B)

| STEP No. | INSTRUCTION |
|---|---|
| S51 | IMAGE BUFFER IS CLEARED |
| S52 | IMAGE DATA OF BLOCK IS PREPARED |
| S53 | FRAME IMAGE DATA IS PREPARED SO THAT FRAME START POINT AND FRAME TERMINATING POINT ARE INCLUDED IN FRAME |
| S54 | JUDGED WHETHER NEXT BLOCK EXISTS |
| S55 | BLOCK SPACE IS INSERTED BETWEEN PRESENT BLOCK AND NEXT BLOCK |
| S56 | TEXT POINTER IS SHIFTED TO NEXT BLOCK |

FIG. 12 (B)

| STEP No. | INSTRUCTION |
|---|---|
| S57 | INITIALIZATION |
| S58 | SEARCHED WHETHER ITALIC START CODE DATA EXISTS IN TEXT |
| S59 | JUDGED WHETHER ITALIC START CODE DATA IS FOUND |
| S60 | TEXT POINTER IS SET TO NEXT CHARACTER |
| S61 | JUDGED WHETHER POINTED CHARACTER IS CORRESPONDED TO LINE CHANGING CODE DATA |
| S62 | JUDGED WHETHER POINTED CHARACTER IS CORRESPONDED TO BLOCK CHANGING CODE DATA |
| S63 | JUDGED WHETHER POINTED CHARACTER IS CORRESPONDED TO FRAME SPACE |
| S64 | JUDGED WHETHER POINTED CHARACTER IS CORRESPONDED TO ITALIC TERMINATING CODE DATA |
| S65 | ITALIC SPACE IS INSERTED BEFORE ITALIC TERMINATING CODE DATA |
| S66 | ITALIC SPACE IS INSERTED BEFORE FRAME SPACE |
| S67 | TEXT POINTER SKIPS FRAME SPACE |
| S68 | ITALIC SPACE IS INSERTED BEFORE LINE CHANGING CODE DATA |

FIG. 14 (B)

| STEP No. | INSTRUCTION |
|---|---|
| S71 | KEY INPUT ? |
| S72 | KEY INPUT FROM CHARACTER KEY ? |
| S73 | TEXT FORMING PROCESS IS CONDUCTED |
| S74 | KEY INPUT FROM FRAME START KEY ? |
| S75 | FRAME EMBELLISHING PROCESS IS CONDUCTED |
| S76 | KEY INPUT FROM ITALIC START KEY ? |
| S77 | ITALIC EMBELLISHING PROCESS IS CONDUCTED |
| S78 | KEY INPUT FROM JUST MODE KEY ? |
| S79 | JUST SETTING PROCESS IS CONDUCTED |
| S80 | KEY INPUT FROM PRINT KEY ? |
| S81 | PRINTING PROCESS IS CONDUCTED |
| S82 | PROCESS CORRESPONDING TO DEPRESSED KEY IS CONDUCTED |

FIG. 15 (B)

| STEP No. | INSTRUCTION |
|---|---|
| S90 | JUST PREPARING PROCESS IS CONDUCTED |
| S91 | POINTER VALUE OF TEXT POINTER IS SET TO HEAD ADDRESS OF TEXT |
| S92 | JUDGED WHETHER POINTER VALUE COINCIDES WITH POSITION DATA OF HEAD CHARACTER |
| S93 | JUST SPACE IS READ OUT FROM JUST SPACE MEMORY |
| S94 | POSITION DATA OF HEAD CHARACTER IS READ OUT FROM POSITION MEMORY |
| S95 | CHARACTER CODE DATA POINTED BY TEXT POINTER IS READ OUT |
| S96 | DOT PATTERN DATA IS TRANSMITTED TO PRINT BUFFER |
| S97 | JUDGED WHETHER JUST FLAG IS SET TO "ON" |
| S98 | ARRANGING POSITION OF CHARACTER IS SET TO POSITION ADVANCED BY JUST SPACE |
| S99 | JUDGED WHETHER POINTER VALUE POINTS LAST POSITION OF TEXT |
| S100 | DOT PATTERN DATA IN PRINT BUFFER IS PRINTED |
| S101 | POINTER VALUE IS COUNTED UP BY "1" |

| STEP No. | INSTRUCTION |
|---|---|
| S110 | PRINT LENGTH OF EACH PRINTING LINE IS CALCULATED |
| S111 | CHARACTER NUMBER IN EACH PRINTING LINE IS CALCULATED BY OMITTING FRAME SPACE CODE DATA AND ITALIC SPACE CODE DATA |
| S112 | DIFFERENCE OF PRINT LENGTH FROM LONGEST PRINTING LINE IS OBTAINED FOR EACH PRINTING LINE |
| S113 | JUST SPACE IS OBTAINED BY DIVIDING DIFFERENCE BY "CHARACTER NUMBER -1" |
| S114 | POSITION DATA OF CHARACTER AT HEAD POSITION OF EACH PRINTING LINE IS CALCULATED |

ABCD 123
EF
GHI 4567

FIG. 17 (b)

| ABCD | 123 |
| EF | |
| GHI | 4567 |

FIG. 17 (c)

*ABC* | *DE* | *G*
*HIJ*

PRINTER CAPABLE OF SPACING CHARACTERS WITHIN FRAME

BACKGROUND OF THE INVENTION

1. Field of the Invention

The present invention relates to a printer capable of printing characters in a desired frame, and more particularly to a printer capable of printing characters within a desired frame enclosing the characters without overlapping the characters with lines of frame by forming suitable spaces between a character positioned at the left end position and a left frame line of the frame and between a character positioned at right end position and a right frame line of the frame, when printing the characters and the frame, thereby it can be obtained on a print medium an attractive printing image with suitable impression.

2. Description of Related Art

Conventionally, there are proposed various printers with framing function through which characters can be printed within a frame enclosing thereof. For instance, in that conventional printer, a text having the characters enclosed by the frame is printed on a print medium as follows. Here, printing method of the conventional printer will be explained referring to FIGS. 17(a) and 17(b). FIG. 17(a) shows two texts, one having characters and the other having numerals before the frame is formed and FIG. 17(b) shows two texts, one having characters and the other having numerals, after the frames are formed so as to enclose each of the texts.

In case that the frames are respectively printed around each of the texts by the conventional printer, it is not considered to insert spaces between left vertical frame line of the left frame and the character positioned at the left end and between right vertical frame line of the left frame and the character positioned at the right end, further not considered to form spaces between left vertical frame line of the right frame and the numeral positioned at the left end and between right vertical frame line of the right frame and the numeral positioned at the right end. Therefore, as shown in FIG. 17(b), the vertical frame lines of the frame enclosing the one text of the characters, are contacted with the character positioned at the left end and the character positioned at the right end. And similarly, the vertical frame lines of the frame enclosing the other text of the numerals, are contacted with the numerals positioned at the left end and the numeral positioned at the right end.

Concretely speaking, for example, referring to FIG. 17(b), the left portions of the characters [A], [E] and [G], are contacted with the vertical frame line of the frame, and also the right portion of the character [D] is contacted with the vertical frame line of the frame. Further, similarly to the above, the left portion of the numeral [4] and the right portion of the numeral [7] are contacted with the vertical frame lines, respectively. As mentioned above, in case that it not considered to insert spaces between the vertical frame lines and the left or the right portions of the characters and the numerals, the printed image obtained through the conventional printer might become extremely unattractive, thereby there is a problem that it is very difficult to read the printed image.

And the conventional printer has further italic function to embellish the characters by inclining thereof. When the italic function is executed in the conventional printer, at least an italic space is inserted after an italic character which is positioned at the end of the italic characters so that the italic character does not contact with the character adjacent thereto. However, if the framing function is executed in such printer in case that the italic character is located at the left end or the right end position in the text, there is a problem that the frame line is overlapped with the italic character.

SUMMARY OF THE INVENTION

Therefore, it is an object of the present invention to overcome the above mentioned problems and to provide a printer capable of printing characters within a desired frame enclosing the characters without overlapping the characters with lines of the frame by inserting suitable frame spaces at both starting point and terminating point of the frame lines when printing the characters with the frame, thereby it can be obtained a very attractive printed image, which is easy to read, on a print medium.

To accomplish the above object, the present invention provides a printer capable of printing characters within a frame, the printer comprising:

character data input means for inputting character code data of the characters over plural lines, memory means for storing the character code data input from the character data input means, inserting means for inserting frame start code data and frame terminating code data in the memory means, frame space forming means for forming frame spaces according to the frame start code data and the frame terminating code data, setting means for setting a frame start point to the space frame formed according to the frame start code data and a frame terminating point to the frame space formed according to the frame terminating code data, preparing means for preparing image data of the characters based on the character code data and image data of the frame based on both the frame start point and the frame terminating point, the preparing means preparing the image data so that the frame spaces formed by the frame space forming means are included within the frame, image buffer for storing the image data prepared by the preparing means, and print means for printing the image data on a print medium.

According to the present invention above constructed, at first, the character code data of the characters input over plural lines through the character data input means, is stored in the memory means. And both the frame start code data and the frame terminating code data are inserted in the memory means by the inserting means. Thereafter, the frame spaces are formed according to both the frame start code data and the frame terminating code data through the frame space forming means.

And through the setting means, both the frame start point and the frame terminating point are respectively set to the space frame according to the frame start code data and the space frame according to the frame terminating code data. Next, the preparing means prepares both the image data of the characters based on the character code data and the image data of the frame based on the both the frame start point and the frame terminating point. At that time, the preparing means prepares the image data so that frame spaces formed by the frame space forming means are included in the frame. And the image data is stored in the image buffer. Thereafter, the image data is printed on a print medium by the print means.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

BRIEF DESCRIPTION OF THE DRAWINGS

The invention will be described with reference to the following drawings, wherein:

FIGS. 18(A) and 18(B) are illustrations showing printed examples which are printed by the tape printer in the second embodiment.

DETAILED DESCRIPTION OF THE PREFERRED EMBODIMENTS

A detailed description of the first preferred embodiment embodying the present invention will be given referring to the accompanying drawings.

Figure 1:
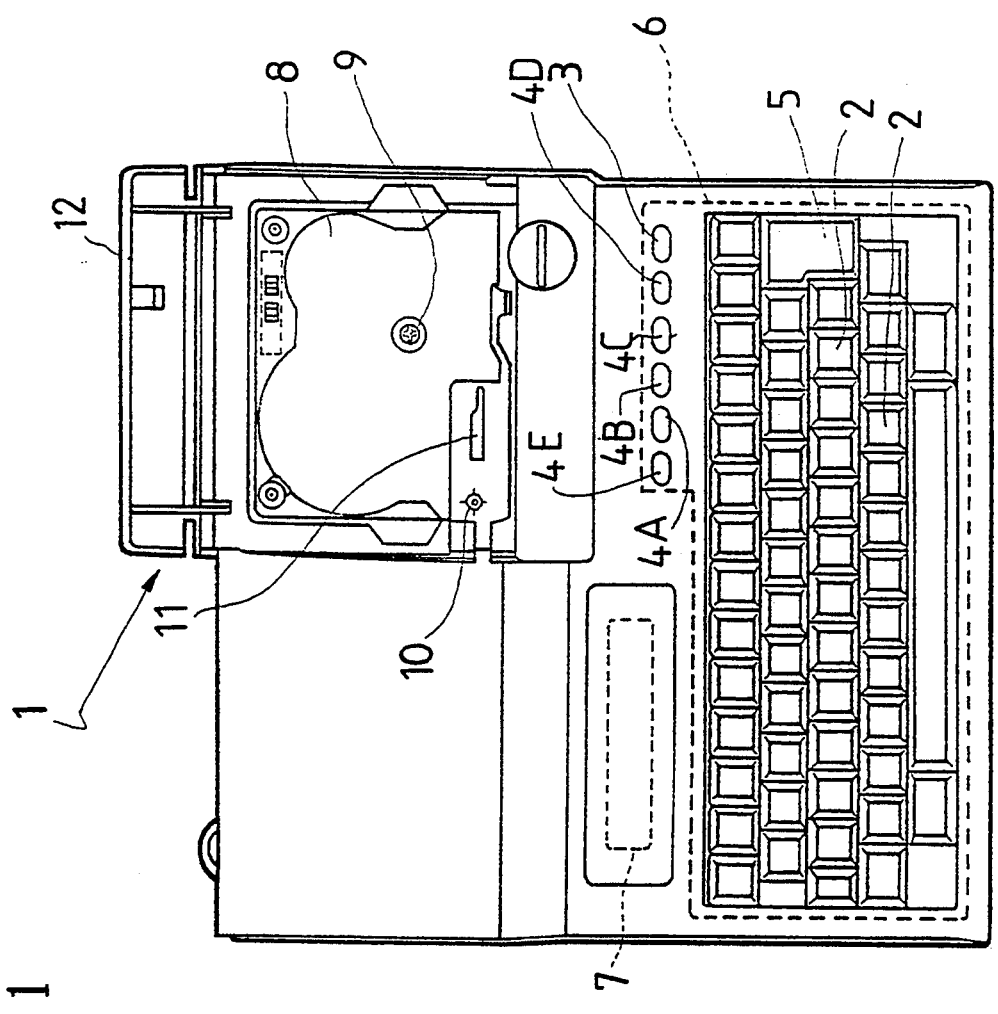
FIG. 1 is a plan view of a tape printer in which a cover is opened, the cover covering an installing part of a tape cassette formed in the tape printer.

With reference to FIG. 1, a keyboard 6, a liquid crystal display 7 and an installing part 8 for a tape cassette 13 (later mentioned), are arranged in a tape printer 1. Here, in the keyboard 6, there are arranged character keys 2 for inputting characters or numerals in plural lines, a print key 3 to start the printing operation, a cursor key K to move a cursor in the right and left directions or the up and down directions on a liquid crystal display 7, a frame start key 4A for setting start point of a frame line and a frame terminating key 4B for setting terminating point of the frame line, an italic start key 4C for setting start point from which italic embellishment of the characters or the numerals is started and an italic terminating key 4D for setting terminating point at which italic embellishment of the characters or the numerals is terminated, a just mode key 4E to set the just mode function through which the characters are mutually arranged while the same space is inserted between the adjacent characters, and a return key 5 to execute line change to the next line and various other processes.

The liquid crystal display 7 displays the characters and the numerals input from the character keys 2. Further, the tape cassette 13 is installed in the installing part 8 arranged in the tape printer 1.

In the installing part 8, it is arranged a ribbon winding shaft 9 which is rotated by a pulse motor (not shown), the ribbon winding shaft 9 rotating a ribbon winding spool 21 in the tape cassette 13, thereby a thermal ink ribbon 17 is wound around the ribbon winding spool 21. And at a forward oblique position from the ribbon winding shaft 9 (at the side toward the keyboard 6), it is arranged a roller shaft 10 to rotate a tape sending roller 27 (later mentioned), the roller shaft 10 being rotated through suitable transmitting mechanism by a tape sending motor 40 (later mentioned) and rotating the tape sending roller 27.

Further, at forward position of the installing part 8, it is fixedly arranged a thermal head 11 which prints the characters and the numerals on a film tape 15 (later mentioned) through the thermal ribbon 17. And the installing part 8 is opened or closed by a cover 12 which is rotatably supported to a rear part of the tape printer 1 so that the cover 12 opens and closes the installing part 8, and in the open state of the cover 12, the tape cassette 13 used is exchanged with a new tape cassette 13.

Figure 2:
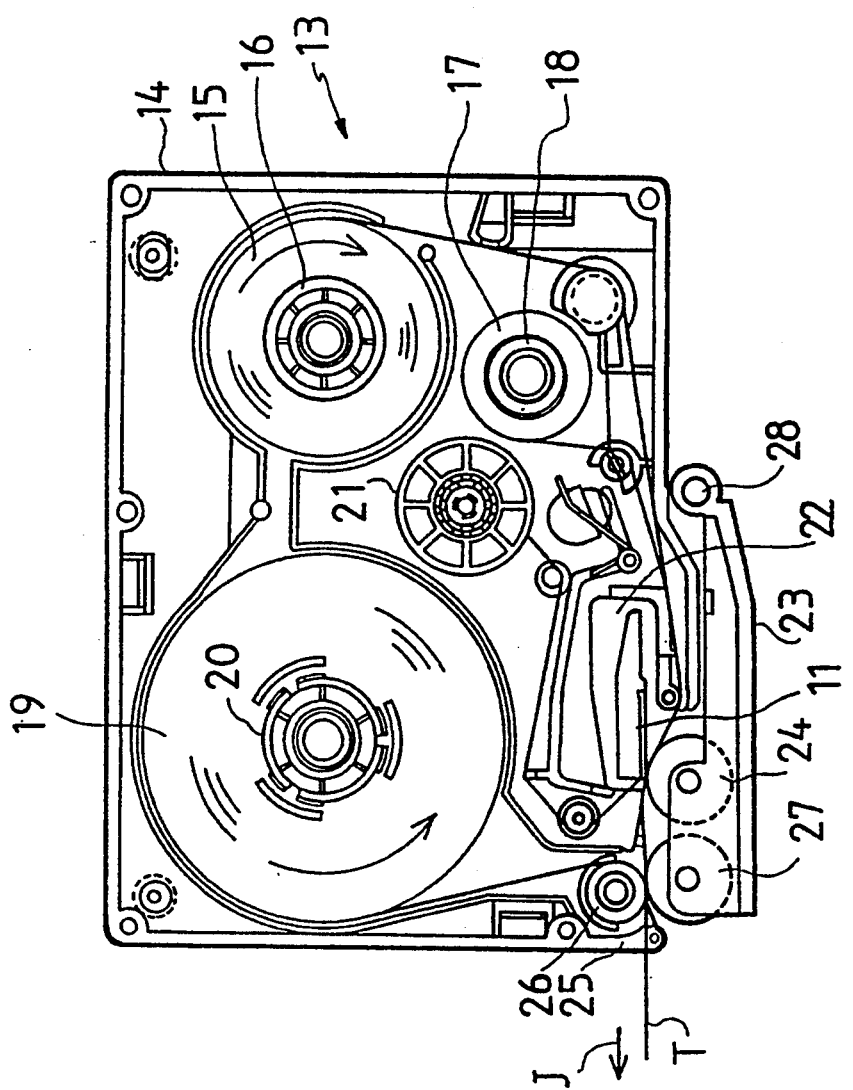
FIG. 2 is an enlarged plan view in partial section of the tape cassette which is installed in the installing part of the tape printer.

Next, construction of the tape cassette 13 will be described referring to FIG. 2. FIG. 2 shows an enlarged plan view in partial section of the tape cassette 13 which is installed in the installing part 8 of the tape printer 1. Here, in FIG. 2, an upper case of the tape cassette 13 is omitted.

In FIG. 2, a tape spool 16 around which a clear film tape 15 is wound, a ribbon spool 18 around which the thermal ink ribbon 17 is wound and an adhesive tape spool 20 around which double sided adhesive tape 19 is wound so that release paper of the tape 19 directs to the outer surface thereof, are arranged in a lower case 14 of the tape cassette 13. These spools 16, 18 and 20 are rotatably supported in cooperation with supporting portion formed on a lower side of the upper case (not shown).

And among the spools 16, 18 and 20, it is rotatably supported a ribbon winding spool 21 and the ribbon winding spool 21 is meshed with the ribbon winding shaft 9. Thus, the ribbon winding spool 21 winds the thermal ink ribbon 17 consumed for printing of the characters by being rotated through the ribbon winding shaft 9. Further, the thermal head 11 is located in a hollow portion 22 formed in the lower case 14 of the tape cassette 13 and is opposed to a platen roller 24 which is rotatably supported in a roller holder 23, so that the thermal head 11 can contact with the platen roller 24. Such thermal head 11 has a plurality of heat elements (in the tape printer 1 of this embodiment, heat elements of 128 are formed in the thermal head 11), thus, the thermal head 11 conducts printing of the characters and the numerals on the clear film tape 15 through the thermal ink ribbon 17.

And a tape pressing roller 26 is rotatably supported at a position near an exhausting portion 25 formed in the lower case 14 (the exhausting portion 25 is indicated at left lower side in FIG. 2) and also a tape sending roller 27, which is rotatably supported on the roller holder 23, is positioned so as to be able to contact with the tape pressing roller 26.

In the installing part 8, at forward position of the tape cassette 13 (at lower side in FIG. 2), the roller holder 23 is rotatably supported through a supporting shaft 28 and is made movable between a printing position where the thermal head 11 and the platen roller 24 are contacted with each other and a release position where the thermal head 11 and the platen roller 24 are spaced, through changing mechanism by which the roller holder 23 is manually changed between the printing position and the release position. Here, in FIG. 2, it is represented a state where the roller holder 23 is changed to the printing position. In such roller holder 23, the platen roller 24 and the tape sending roller 27 are rotatably supported so that the platen roller 24 and the tape sending roller 27 are contacted with the thermal head 11 and the tape pressing roller 26, respectively, when the roller holder 23 is changed to the printing position.

Here, the tape sending roller 27 is rotated by the roller shaft 10 and at the same time, the tape pressing roller 26 is cooperatively rotated with the tape sending roller 27 through a gear mechanism (not shown). The tape pressing roller 26 and the tape sending roller 27 cooperatively depresses the film tape 15, on which the characters and the numerals are printed through the thermal ribbon 17, by the thermal head 11, and the adhesive face of the double sided adhesive tape 19, thereby the tape T is formed and forwarded to the direction indicated by an arrow J.

Figure 3:
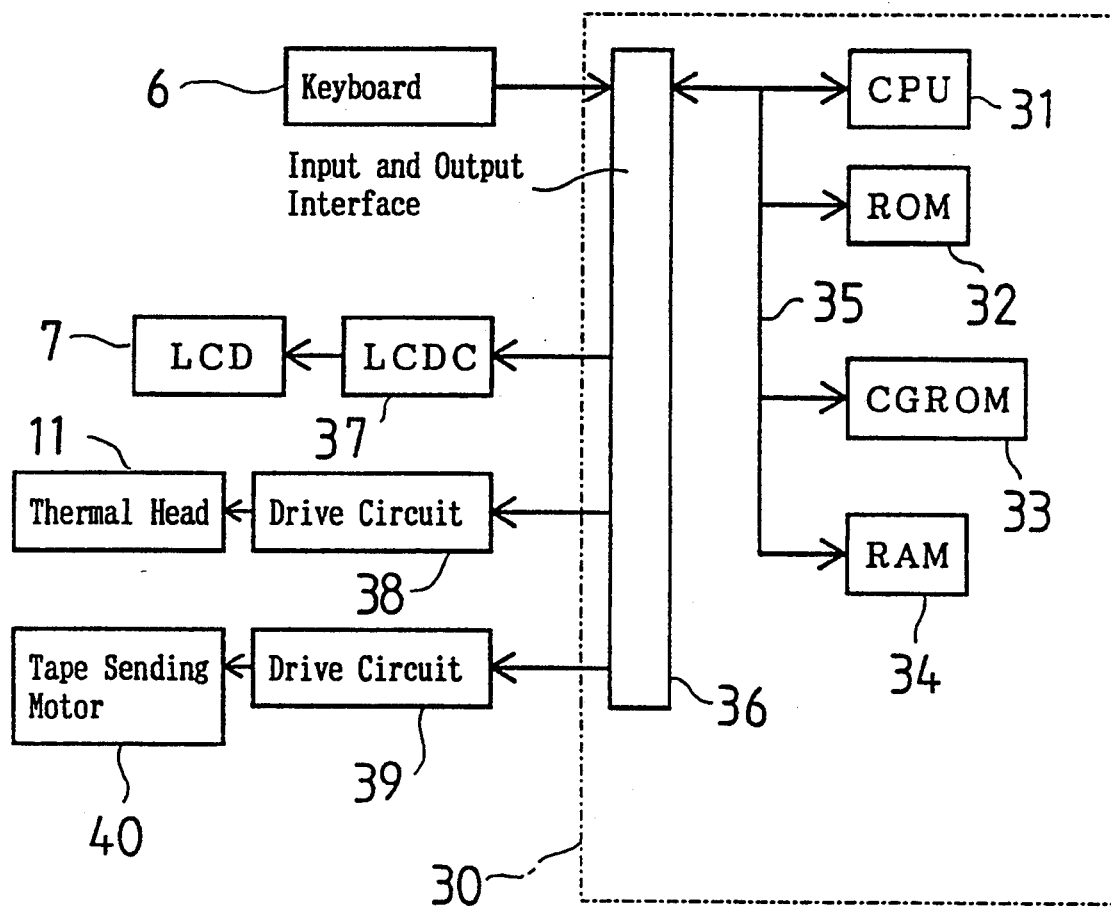
FIG. 3 is a block diagram of a control device which controls the tape printer.

In addition to the above, a control device of the tape printer 1 above constructed will be described with reference to FIG. 3. FIG. 3 is a block diagram of a control device which controls the tape printer 1. In FIG. 3, the control device is mainly constructed from a control device 30 having a CPU 31, a ROM 32, a CGROM 33 and a RAM 34. The CPU 31, the ROM 32, the CGROM 33 and the RAM 34 are mutually connected to an input and output interface 36 through a bus line 35.

Here, the ROM 32 is for storing various programs such as a printing control program, a control program for the printing process, a control program for use when the inserting process of framing spaces is conducted, a control program for use when the inserting process of framing spaces is conducted in the case of single printing line, a control program for use when the inserting process of framing spaces is conducted in case of plural printing lines, a control program for use when the inserting process of framing spaces is conducted in case of plural blocks in each of which several printing lines exist, a control program for use when image data of a text having characters and frames is prepared in an image buffer, a control program for use when the inserting process of italic spaces is conducted, a control program for use in the preparing process necessary before the just mode function is conducted and other various programs necessary to control the tape printer 1. The CPU 31 conducts various calculations based on the programs stored in the ROM 32.

Figure 4:
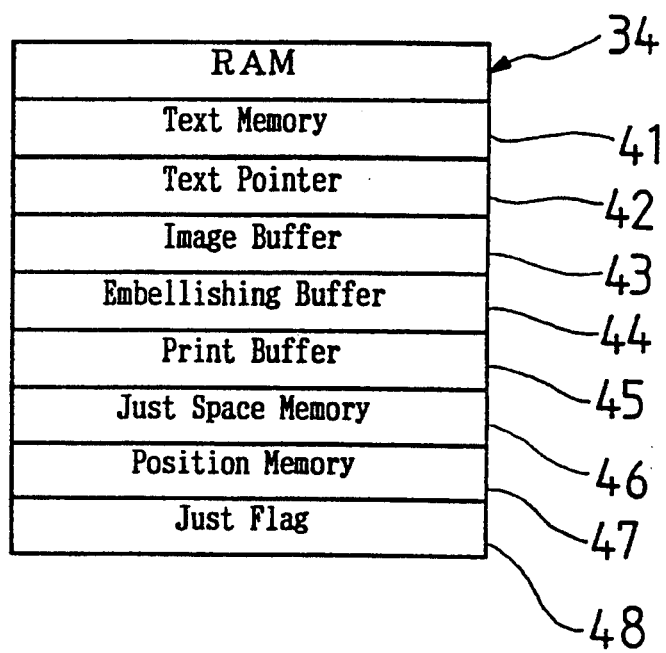
FIG. 4 is a schematic view to explain a RAM.

The CGROM 33 stores dot pattern data corresponding to the characters input from the keyboard 6, the dot pattern data being read out from the CGROM 33 and transmitted to an image buffer 43 (later mentioned). Also, in the CGROM 33, the printing width of each character and the printing width of the italic characters when the characters are embellished in italic form are stored corresponding to code data of each character. Further, the RAM 34 is for temporarily storing the calculated data by the CPU 31 and in the RAM 34, various memories are formed as shown in FIG. 4. In FIG. 4, a text memory 41 continuously stores code data of the characters input from the keyboard 6 as document data. A text pointer 42 is for pointing the storing area in the text memory 41 to store the document data.

Further, the image buffer 43 stores the dot pattern data read out from the CGROM 33 corresponding to the code data of the characters stored in the text memory 41 and the framing pattern data formed corresponding to the framing code data stored in the text memory 41. The embellishing buffer 44 stores the dot data embellished through the frame embellishing process or the italic embellishing process based on the dot pattern data stored in the image buffer 43. Print buffer 45 is for storing the dot data, which is stored in the embellishing buffer 44 and transmitted to the print buffer 45, and the thermal head 11 conducts dot printing of the characters according to the dot data stored in the print buffer 45. The just space memory 46 is for storing the just space amount calculated every each printing line through the just preparing process when the just mode function is conducted (later mentioned). Position memory 47 is for storing position data of the character arranged at the head position of each printing line when the just mode function is executed, the position data being calculated in the just preparing process. Further, just flag 48 is a memory for storing the depressing state of the just mode key 4E. The just flag 48 is set to "ON" when the just mode key 4E is depressed and set to "OFF" when the just mode key 4E is successively depressed.

Here, continuing to explain the control device shown in FIG. 3, the keyboard 6 is connected to the control device 30 through the input and output interface 36, and also both the liquid crystal display 7 and the display controller 37 are connected to the control device 30 through the interface 36. Thereby, when the characters are input from the keyboard 6, the code data of the characters is successively stored in the text memory 41 and further, the characters input from the keyboard 6 are displayed on the liquid crystal display 7 under control by the CPU 31 based on the control program for producing the dot pattern data and the display control program stored in the ROM 32.

The thermal head 11 is driven by a drive circuit 38 and prints the dot pattern data stored in the print buffer 45. Synchronously with printing operation of the thermal head 11, a tape sending motor 40 feeds the tape T by being driven through a drive circuit 39.

Figure 5:
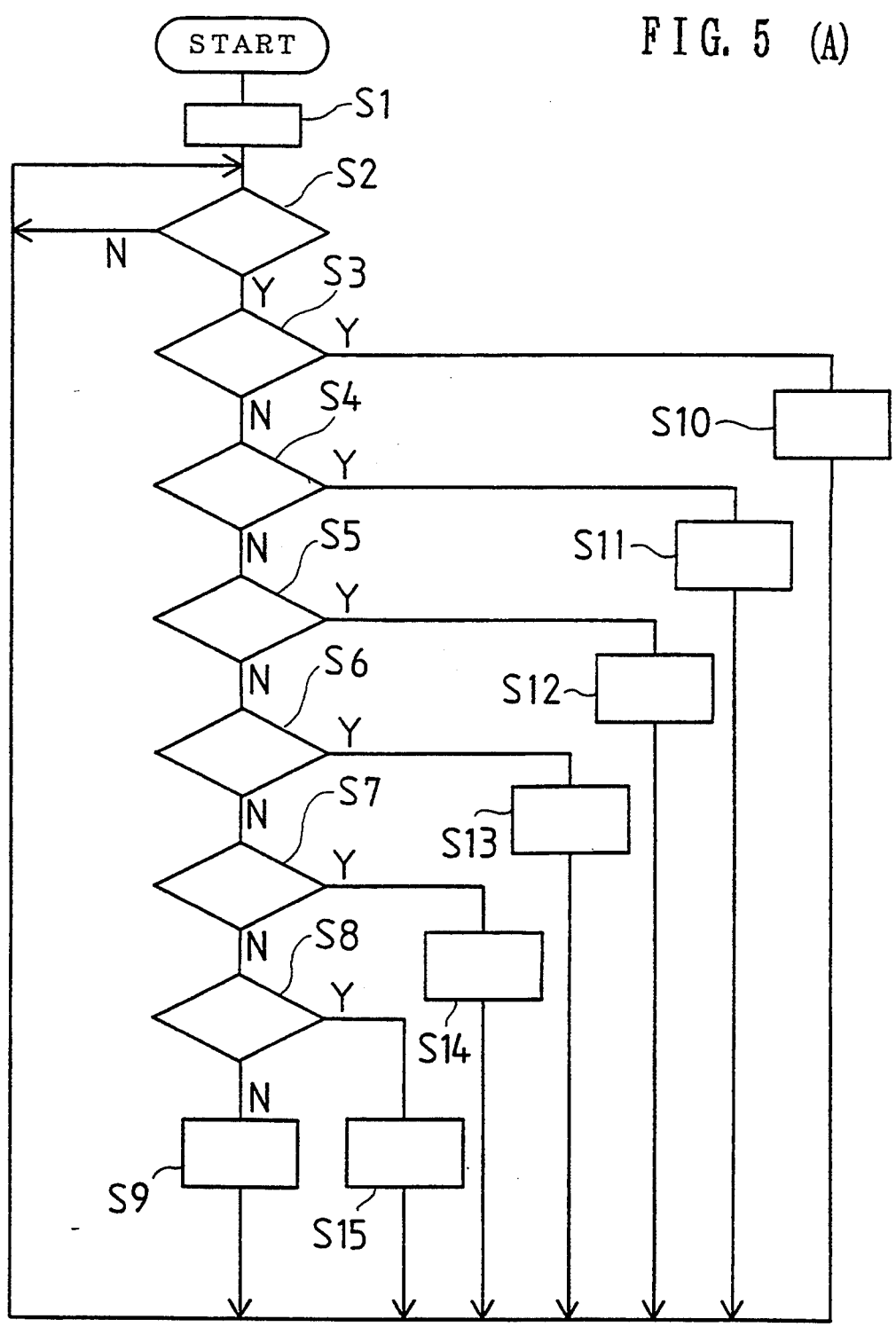
FIGS. 5(A) and 5(B) are a flowchart of the printing control program for use in the first embodiment of the present invention.
Figure 6:
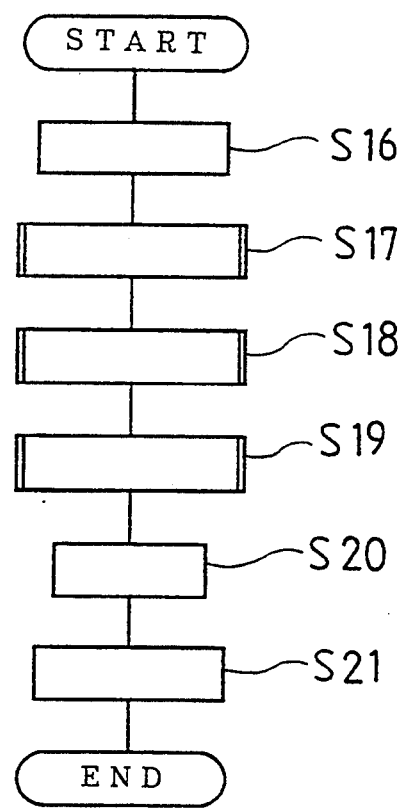
FIGS. 6(A) and 6(B) are a flowchart of the control program for use when the printing process is conducted in the first embodiment.
Figure 7:
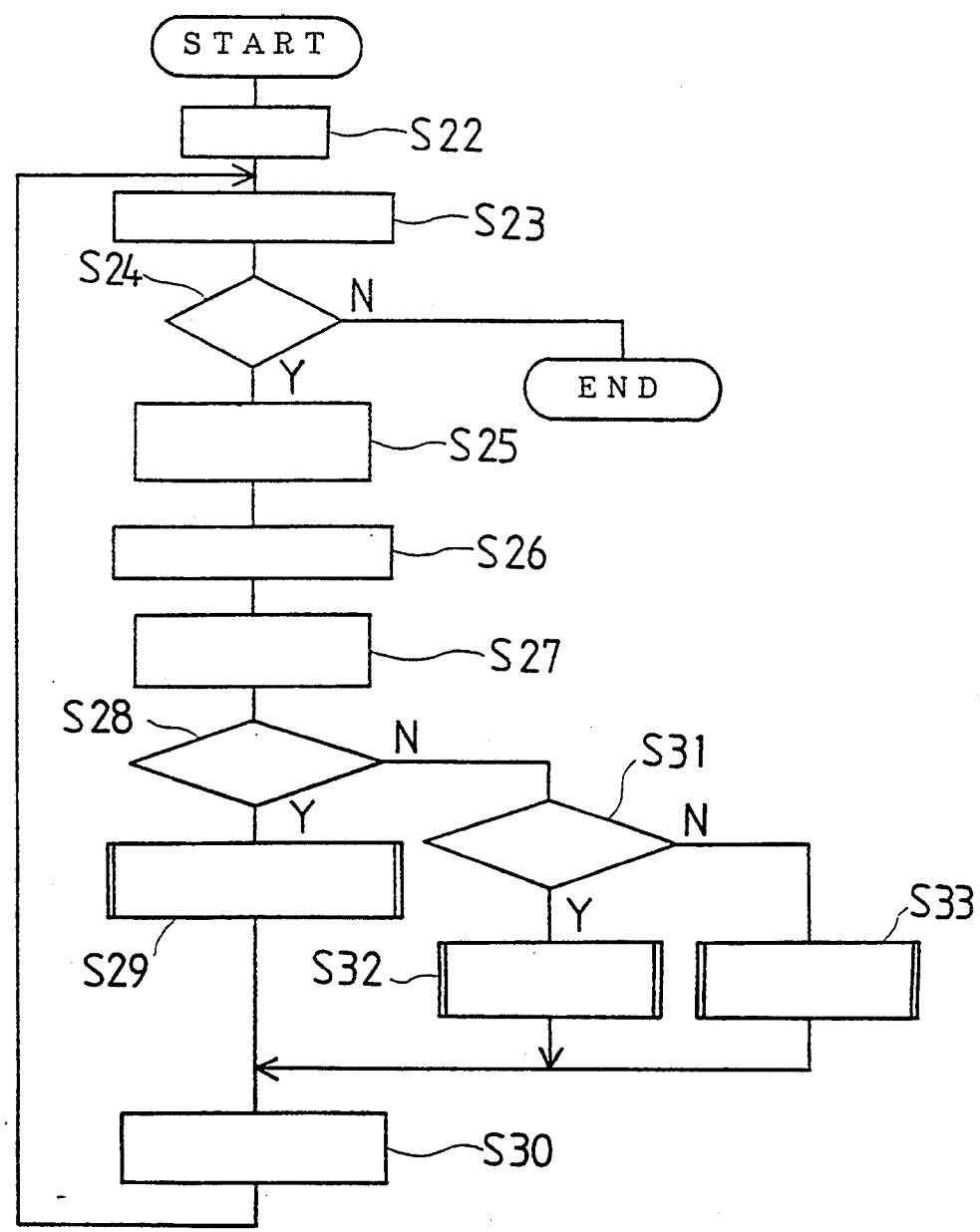
FIGS. 7(A) and 7(B) are a flowchart of the control program for use when the inserting process of frame spaces is conducted in the first embodiment.
Figure 8:
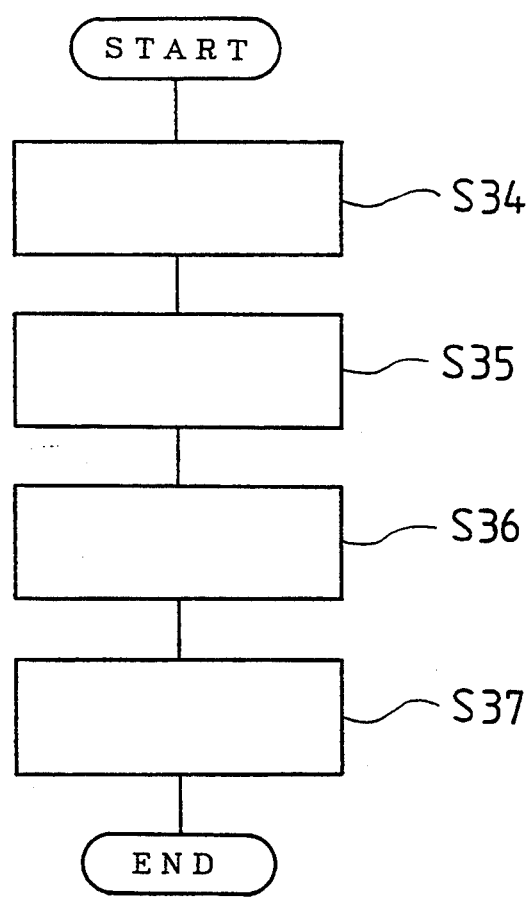
FIGS. 8(A) and 8(B) are a flowchart of the control program for use when the inserting process of frame spaces is conducted in the case of single printing line in the first embodiment.
Figure 9:
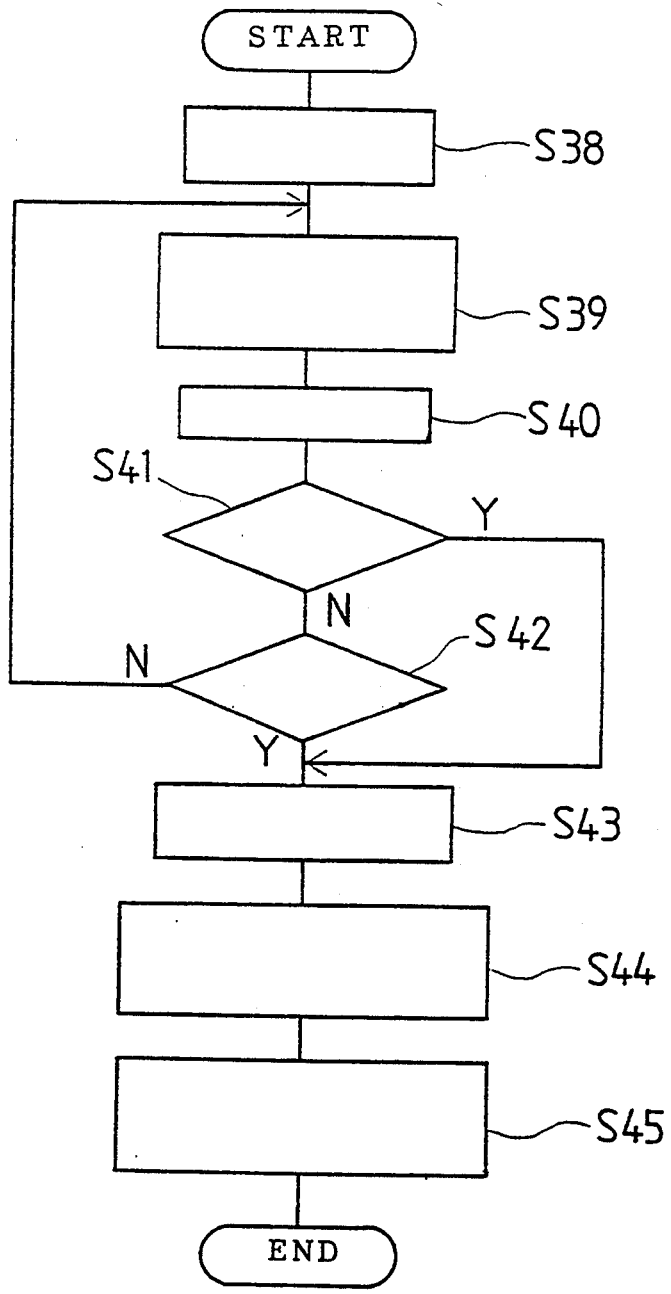
FIGS. 9(A) and 9(B) are a flowchart of the control program for use when the inserting process of framing spaces is conducted in the case of plural printing lines in the first embodiment.
Figure 10:
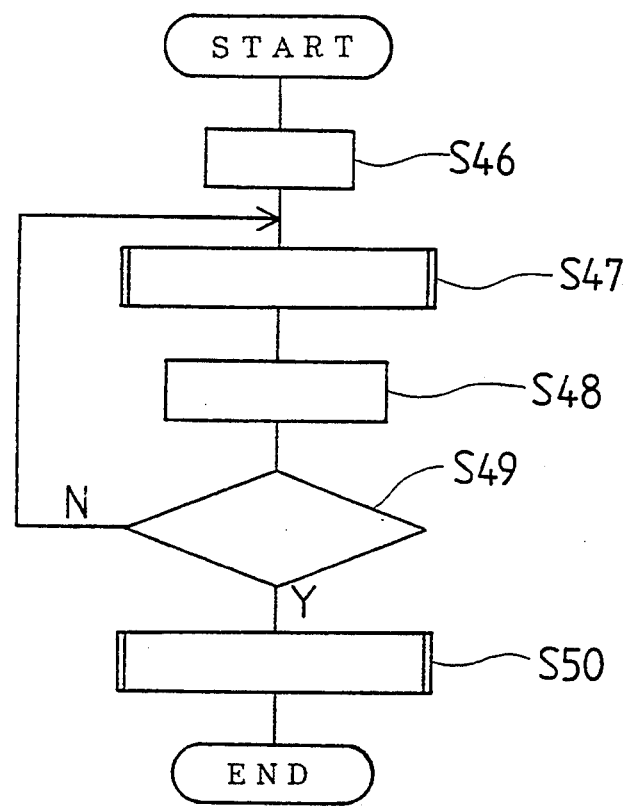
FIGS. 10(A) and 10(B) are a flowchart of the control program for use when the inserting process of frame spaces is conducted in the case of plural blocks in each of which several printing lines exist, in the first embodiment.
Figure 11:
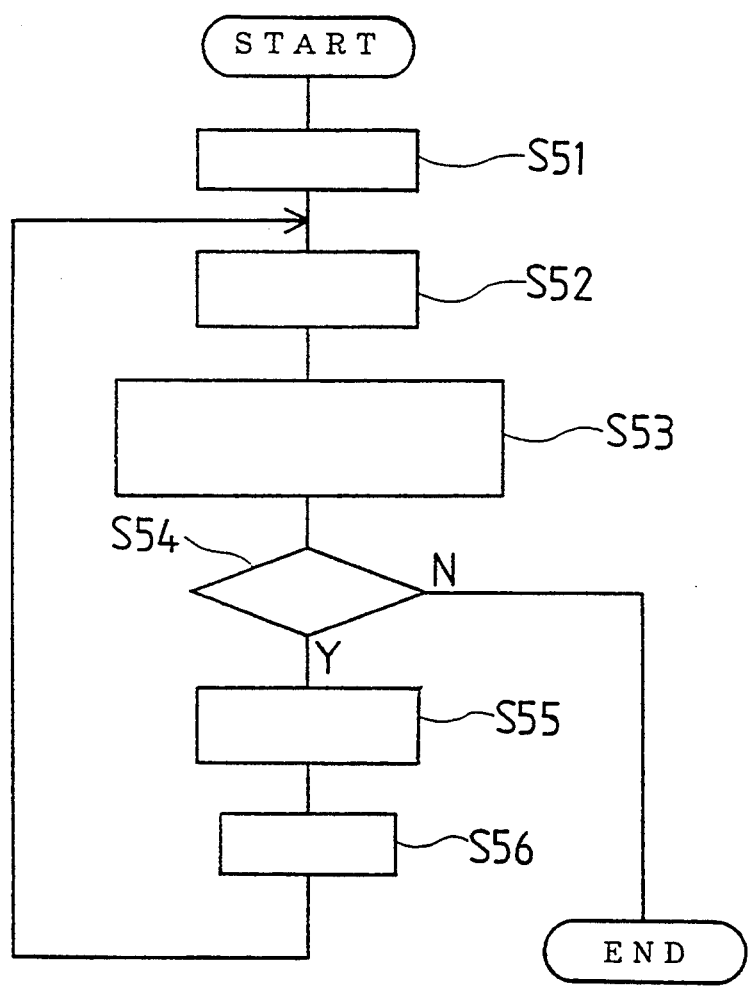
FIGS. 11(A) and 11(B) are a flowchart of the control program for use when the image data of a text having characters and frames is prepared in an image buffer, in the first embodiment.
Figure 12:
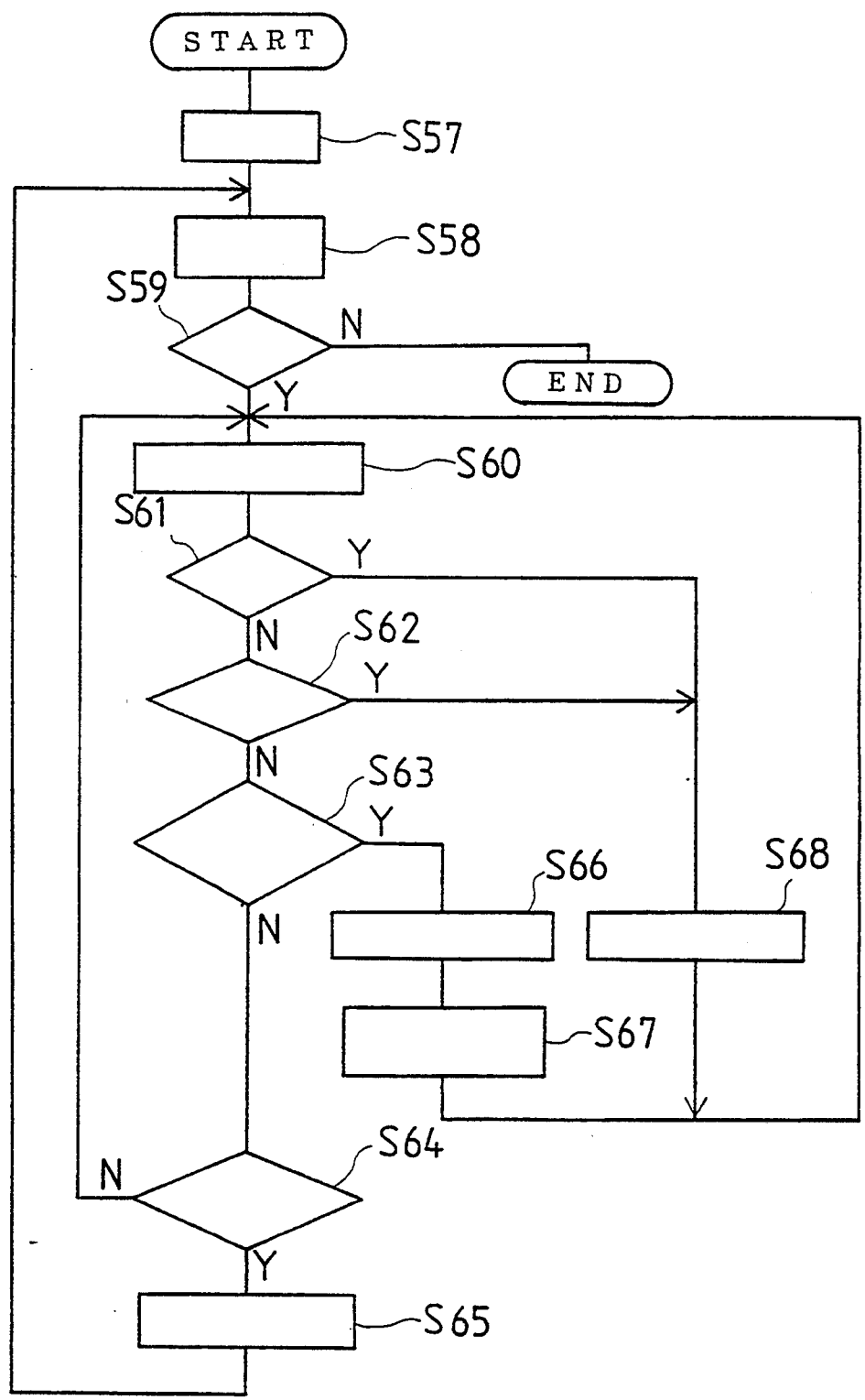
FIGS. 12(A) and 12(B) are a flowchart of the control program for use when the inserting process of italic spaces is conducted in the first embodiment, FIGS. 13($a$), 13($b$) and 13($c$) are schematic views to explain positions at which the frame space and the italic space are inserted, in the first embodiment.

Next, operation of the tape printer 1 constructed above will be described according to FIGS. 5(A)–13(C). With reference to FIGS. 5(A) and (B), initialization is conducted in step (abbreviated as "S" hereinafter) S1. Thereafter, it is judged whether key input from any key on the keyboard 6 is produced in S2. If judged that the key input is produced (S2: YES), the procedure is shifted to S3. On the contrary, if judged that the key input is not produced (S2:NO), the procedure waits until the key input is produced. In S3, it is judged that the key input is produced from the print key 3. If judged that the key input is produced from the print key 3 (S3: YES), the procedure is shifted to S10, and after the printing process is conducted in S10 (later mentioned), and the procedure returns to S2.

In case that the key input is not produced from the print key 3 (S3: NO), it is judged in S4 whether the key input is produced from the frame start key 4A. If judged that the key input is produced from the frame start key 4A (S4: YES), the procedure is shifted to S11 and code data to give instruction for starting the frame line (frame start code data) is stored in a memory area pointed by the text pointer 42 (where the cursor is located) in the text memory 41, thereafter the procedure returns to S2.

Contrarily, if judged in S4 that the key input is not produced from the frame start key 4A (S4:NO), it is judged in S5 whether the key input is produced from the frame terminating key 4B. If judged that the key input is produced from the frame terminating key 4B (S5:YES), the procedure is shifted to S12 and code data to give instruction for terminating the frame line (frame terminating code data) is stored in a memory area pointed by the text pointer 42 (where the cursor is located) in the text memory 41, thereafter the procedure returns to S2.

If judged in S5 that the key input is not produced from the frame terminating key 4B (S5:NO), it is judged in S6 whether the key input is produced from the italic start key 4C. In case that the key input is produced from the italic start key 4C (S6:YES), the procedure is shifted to S13 and code data to give instruction for starting the italic embellishment (italic start code data) is stored in a memory area pointed by the text pointer 42 (where the cursor is located) in the text memory 41, thereafter the procedure returns to S2.

If the key input is not produced from the italic start key 4C (S6:NO), it is judged in S7 that the key input is produced from the italic terminating key 4D. If judged in S7 that the key input is produced from the italic terminating 4D (S7:YES), the procedure is shifted to S14 and code data to give instruction for terminating the italic embellishment (italic terminating code data) is stored in a memory area pointed by the text pointer 42 (where the cursor is located) in the text memory 41, thereafter the procedure returns to S2.

Further, if judged in S7 that the key input is not produced from the italic terminating key 4D (S7:NO), it is judged in S8 whether the key input is produced from a character key 2. If judged in S8 that the key input is produced from a character key 2 (S8:YES), the procedure is shifted to S15 and character code data corresponding to the input character is stored in a memory area pointed by the text pointer 42 (where the cursor is located) in the text memory 41, thereafter the procedure returns to S2. If it is judged that the key input is not produced from a character key 2 (S8:NO), the process corresponding to the input key is conducted in S9, thereafter the procedure returns to S2.

Next, the printing process executed in step S10 will be described with reference to FIGS. 6(A) and (B). Referring to FIGS. 6(A) and (B), back-up process to copy the text data (the character data) stored in the text memory 41 into non-used area of the text memory 41, is executed in S16 so that current, storing state of the text data in the text memory 41 is maintained. Thereafter, the process for inserting the frame spaces (later mentioned according to FIGS. 7(A) and (B)) and the process for inserting the italic space (later mentioned according to FIGS. 12(A) and (B)) is conducted in S18. Thus formed text data with the frame spaces and the italic spaces is converted into the image data in S19, and the image data is stored in the image buffer 43. In S20, the image data is printed on the film tape 15 through the thermal head 11, thereafter the text data is cleared and the backed up data in S16 is restored in the text memory 41 (S21).

Next, inserting process of the frame spaces executed in S17 will be described referring to FIGS. 7(A) and (B). In FIGS. 7(A) and (B), after initialization is conducted in S22, it is searched whether the code data to start the frame line (frame start code data) exists in the text memory 41. As a result of the search, the procedure ends if the frame start code data is not found in the text memory 41 (S24:NO). On the contrary, if the frame start code data is found (S24: YES), the text pointer 42 is set to the line head where the frame start code data exists (S25) and it is searched whether the code data to terminate the frame line (frame terminating code data) exists in the text memory 41. Further, the text pointer 42 is set to the line end where the frame terminating code data exists (S27) and it is judged whether both the frame start code data and the frame terminating code data are in the same line in S28.

If it is judged that both the code data are in the same line (S28: YES), inserting process of frame spaces in case of single line (later mentioned) is conducted in S29. Contrarily, if judged that both of the code data are not in the same line (S28:NO), it is judged whether both the code data are in the same block in S31. Here, the block means a block where several characters or lines are gathered in a unit by inserting two block codes both at a start position of the characters or the lines and at an end position thereof.

If judged that both the frame start code data and the frame terminating code data are in the same block (S31:YES), inserting process of frame spaces in case of plural printing lines (later mentioned) is conducted in S32. On the contrary, if judged that both of the code data are not in the same block (S31:NO), inserting process of frame spaces in case of plural blocks (later mentioned) is conducted in S33. After one of the processes in S29, S32 and S33 is conducted, the text pointer 42 is set to the next point after the frame terminating code data in S30 and the procedure returns to S23. Further, the processes from S23 through S33 are conducted again about the next frame start code data. These processes are repeated until they are done for all of the frame start code data in the text.

Next, the inserting process of frame spaces in case of single printing line executed in S29 will be described according to FIGS. 8(A) and (B). At first, two frame spaces are inserted before and after the frame start code data (S34), and further, two frame spaces are similarly inserted before and after the frame terminating code (S35). A frame start point is set to the frame space after the frame start code data (S36). Similarly to S36, a frame terminating point is set to the frame space before the frame terminating code data (S37). By these processes, the inserting process of frame spaces in the case of single printing line is finished.

Further, inserting process of frame spaces in case of plural printing lines executed in S32 will be described according to FIGS. 9(A) and (B). First, the text pointer 42 is set to the frame start code data (S38), thereafter two frame spaces are inserted both the line head and the line end of the line where the pointer exists, in S39. And the text pointer 42 is shifted to the next line after renewed (S40). In S41, it is judged whether the frame terminating code data is in that line. If judged that the frame terminating code data is not in the line (S41:NO), the procedure is shifted to S42. On the other hand, if judged that the frame terminating code data is in the line (S41:YES), the procedure is shifted to S43. In S42, it is judged whether the block code data is in the line. If judged that the block code data is in the line (S42:YES), the procedure is shifted to S43. If judged that the block code data is not in the line (S42:NO), the procedure returns to S39, thereafter the procedures from S39 through S41 are repeated until the text pointer 42 points the line in which the frame terminating code data exists. In S43, the frame spaces are inserted at both the line head and the line end of the line in which the text pointer 42 points. Thereafter, a frame start point is set to the frame space which is inserted at the line head of the line where the frame start code data exists (S44) and a frame terminating point is set to the frame space which is inserted at the line end of the line where the frame terminating code data exists (S45). Thereafter, the inserting process of frame spaces in case of plural printing lines is finished.

Next, inserting process of frame spaces in case of plural blocks executed in S33 will be described based on FIGS. 10(A) and (B). After initialization is conducted in S46, above mentioned inserting process of frame spaces in case of plural printing lines executed in S32 (which is executed through S38 to S45 according to FIG. 9(A) and 9(B), is conducted (S47). Thereafter, the procedure is shifted to the next block in S48. In S49, it is judged whether the frame terminating code data is in the block. If judged that the frame terminating code data is in the block (S49:YES), the procedure is shifted to S50. On the other hand, if judged that the frame terminating code data is not in the block (S49:NO), the procedure returns to S47 and the procedures in S47, S48 are repeated until the text pointer 42 points to the block in which the frame terminating code data exists. And in S50, the inserting process of frame spaces in case of plural printing lines executed in S32, is executed, thereafter the procedure is finished.

Next, the process for forming the image data of the text having the characters and the frame in the image buffer 43 will be described according to FIGS. 11(A) and (B). At first, in S51, the image buffer 43 is cleared and the image data stored therein at that time is erased. In S52, the image data of the block in which the text pointer 42 exists is prepared and the frame image data is prepared based on two opposite angle points, one corresponding to the frame start point (set in S44) and the other corresponding to the frame terminating point (set in S45), so that both the frame start point and the frame terminating point are enclosed in the frame (S53). Further, it is judged whether the next block exists in S54. And if judged that the next block does not exist (S54:NO), the procedure is finished. On the contrary, if judged that the next block exists (S54:YES), the procedure is shifted to S55. In S55, a block space is inserted between the present block and the next block and the text pointer 42 is shifted to the next block (S56), thereafter the procedure is backed to S52. Above procedures are repeated until the text pointer 42 points the last block.

Here, in case that the italic characters are included in the text, it is necessary to execute inserting process of italic spaces (which is conducted in S18 as shown in FIG. 6(A)). Therefore, such inserting process of italic spaces will be described with reference to FIGS. 12(A) and (B). In FIGS. 12(A) and (B), after initialization is conducted in S57, it is searched whether the italic start code data exists in the text (S58). If the italic start code data is not found in the text (S59:NO), the procedure is finished. On the other hand, the italic start code data is found in the text (S59:YES), the text pointer 42 is set to the next character (S60). Further, in S61, it is judged whether the character pointed by the text pointer 42 is corresponded to line changing code data. If judged that it corresponds to the line changing code data (S61:YES), the procedure is shifted to S68. On the other hand, if judged that it does not correspond to the line changing code data (S61:NO), it is judged whether the character pointed by the text pointer 42 is corresponded to block changing code data (S62). If judged that it is corresponded to the block changing code data (S62:YES), the procedure is shifted to S68, contrarily if judged that it is not corresponded to the block changing code data (S62:NO), the procedure is shifted to S63.

Here, in S68 (which is executed when it is judged "YES" in S61 or S62), the italic space is inserted before the line changing code data or the block changing code data, thereafter the procedure returns to S60 and after the text pointer 42 is shifted to the next character in S60, the procedure is continued.

Further, in case that it is judged "NO" in S62, it is judged in S63 whether the character pointed by the text pointer 42 is the frame space inserted when the inserting process of frame spaces in case of single printing line is conducted. If judged that such character is the frame space in case of single printing line (S63:YES), the procedure is shifted to S66 and on the other hand, if judged "NO" in S63, the procedure is shifted to S64. In S66, the italic space is inserted before the frame space, thereafter the text pointer 42 skips the frame space (S67) and the procedure returns to S60. After the text pointer 42 is shifted to the next character, the procedure is continued.

If judged "NO" in S63, it is judged in S64 whether the character pointed by the text pointer 42 is corresponded to the italic terminating code data. If judged that such character is not the italic terminating code data (S64:NO), the procedure returns to S60 and after the text pointer 42 is shifted to the next character, the procedure is continued. On the contrary, if judged that such character is the italic terminating code data (S64:YES), the italic space is inserted before the italic terminating code in S65 and the procedure returns to S58 in order to search the next italic start code data. Such procedure is repeated until the italic start code data is not found in the text.

As understandable from the above, there are three points at each point of which the italic space is inserted. That is to say;

(1). the italic space is inserted before the frame start point or the frame terminating point when the frame start point or the frame terminating point exists at a position next to the italic character, (2). the italic space is inserted before the line changing code data or the block changing code data when the line changing code data or the block changing code data exists at a position next the italic character, and (3). the italic space is inserted before non-italic character positioned after the italic character when the non-italic character exists at a position next the italic character.

Figure 13A:
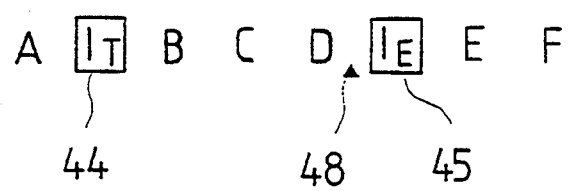
Figure 13B:
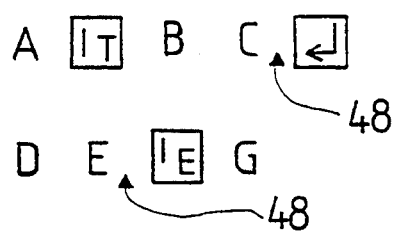
Figure 13C:
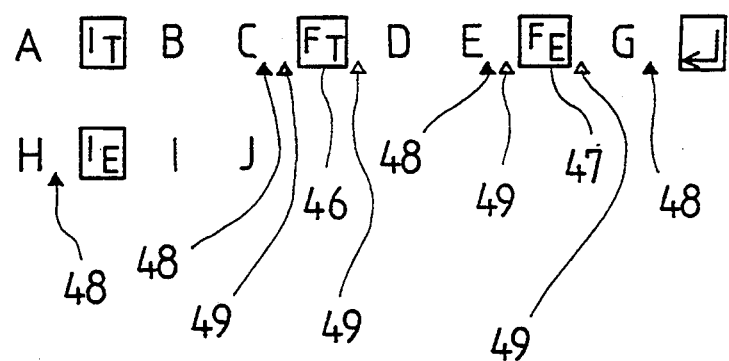
Figure 14:
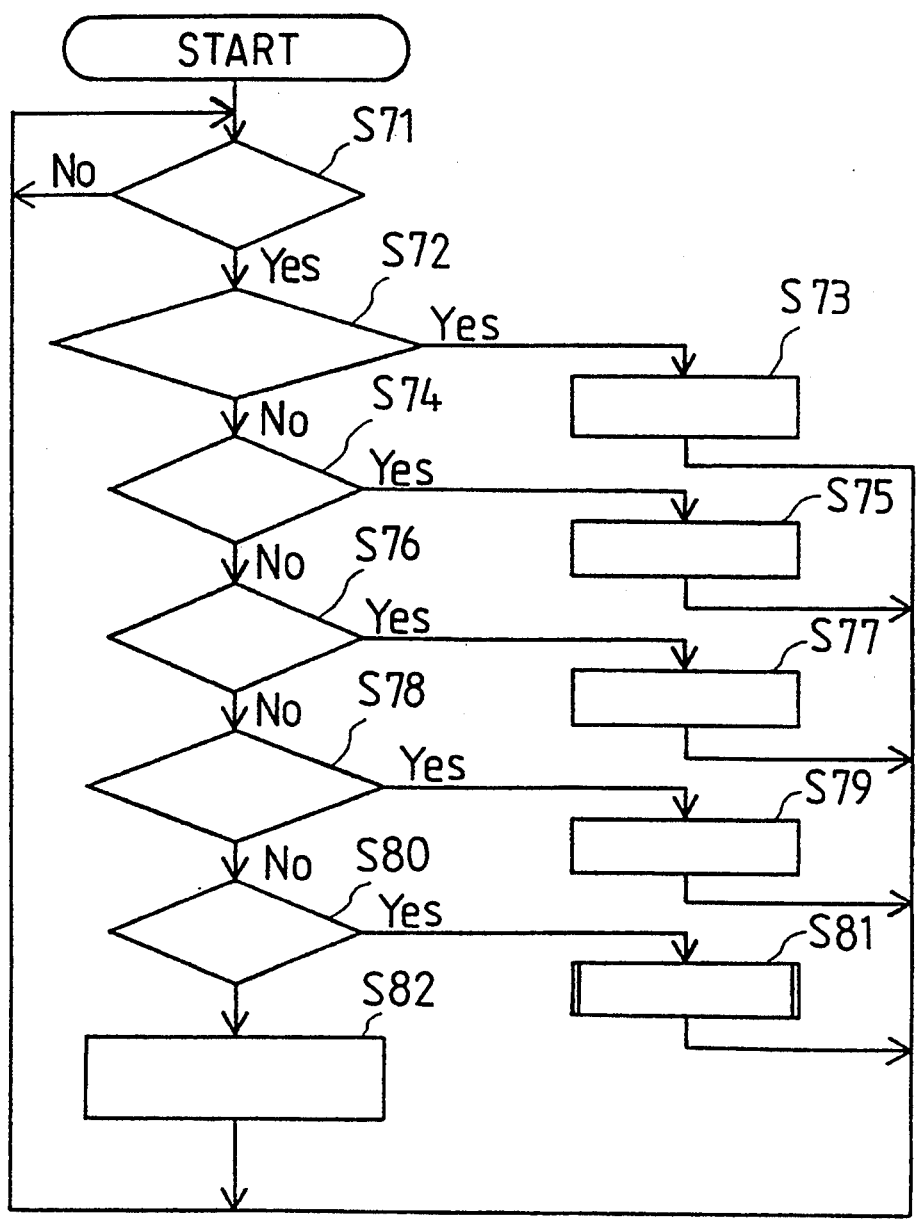
FIGS. 14(A) and 14(B) are a flowchart of the printing control program for use in the second embodiment of the present invention, FIGS. 15(A) and 15 (B) are a flowchart of the control program for use when printing process is conducted in the second embodiment.
Figure 15:
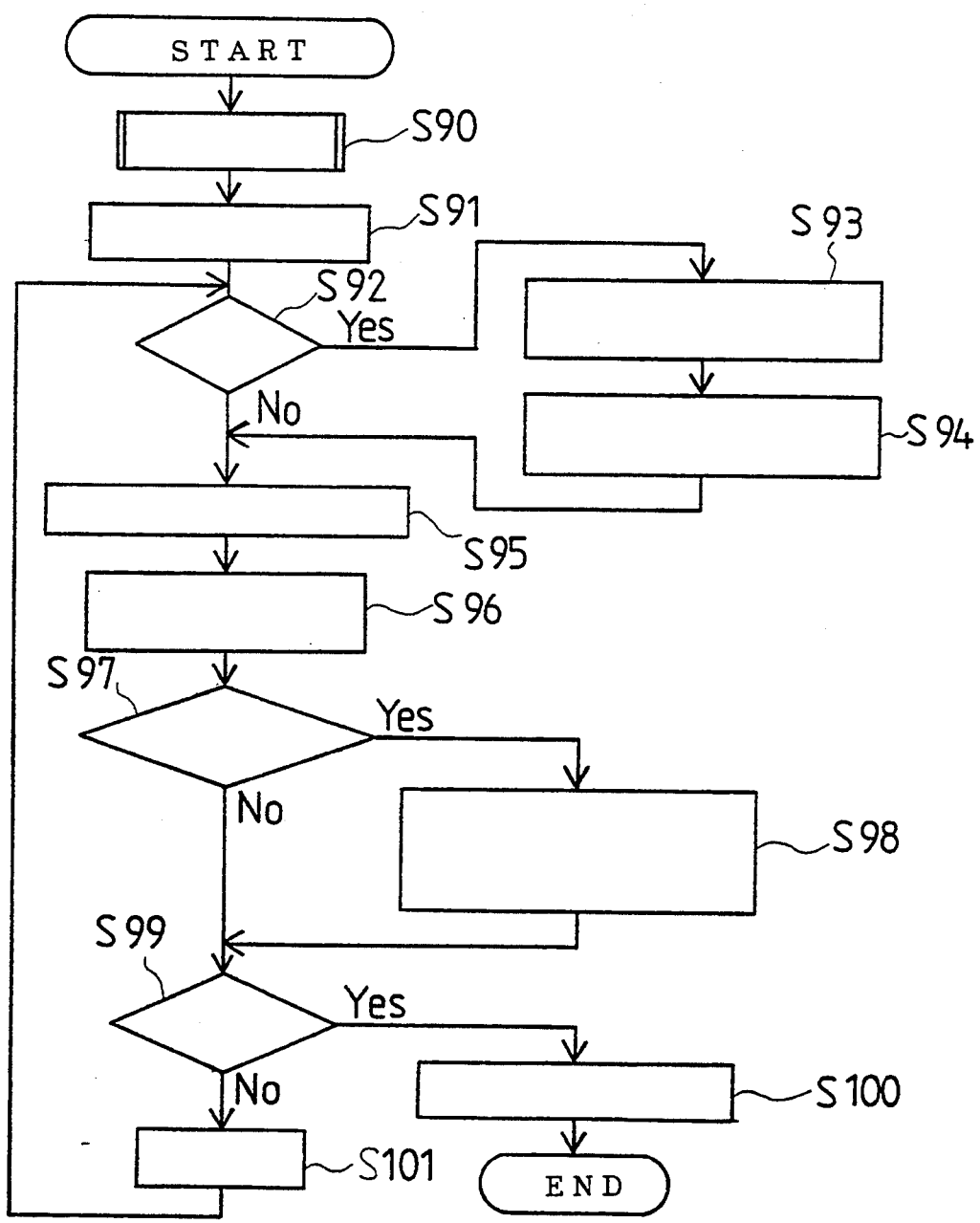
Figure 16:
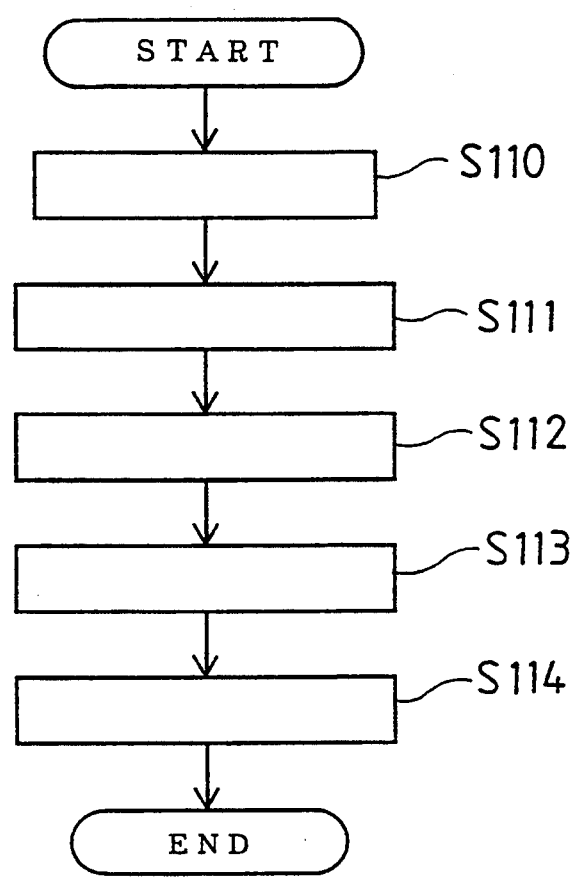
FIGS. 16(A) and 16(B) are a flowchart of the control program executed for preparing of just process before the just process is conducted, in the second embodiment, FIGS. 17($a$), 17($b$) and 17($c$) are illustrations showing printed examples, in which FIGS. 17($a$) and 17($b$) indicate the examples printed by the conventional printer and FIG. 17($c$) indicates the example printed by the tape printer in the first embodiment.

Above three relations are indicated in FIGS. 13(a), 13(b) and 13(c). In FIGS. 13(a), 13(b) and 13(c) the numeral 44 shows the italic start code data, the numeral 45 shows the italic terminating code data, the numeral 46 shows the framing start code data, the numeral 47 shows the frame terminating code data, the numeral 48 shows an inserting position at which the italic space is inserted and the numeral 49 shows an inserting position at which the frame space is inserted, respectively.

In FIG. 13(a), the characters ⌈B⌋, ⌈C⌋ and ⌈D⌋ are the italic characters and the character ⌈E⌋ is not the italic character. Therefore, the italic space 48 is inserted after the character ⌈D⌋ (that is, before the non-italic character ⌈E⌋).

In FIG. 13(b), two line text, one comprising the characters ⌈A⌋, ⌈B⌋ and ⌈C⌋ and the other comprising the characters ⌈D⌋, ⌈E⌋ and ⌈G⌋, is indicated. Here, the characters ⌈B⌋, ⌈C⌋, ⌈D⌋ and ⌈E⌋ are the italic characters and the character ⌈G⌋ is not an italic character. Therefore, in this case, the italic spaces 48 are inserted after the character ⌈E⌋ (before the non-italic character ⌈G⌋) and after the character ⌈C⌋ (before the line changing code data).

In FIG. 13(c), two line text, one comprising the characters ⌈A⌋, ⌈B⌋, ⌈C⌋, ⌈D⌋, ⌈E⌋ and ⌈G⌋ and the other comprising the characters ⌈H⌋, ⌈I⌋ and ⌈J⌋, is indicated. Here, the characters from ⌈B⌋ to ⌈H⌋ are the italic characters and the characters ⌈D⌋ and ⌈E⌋ are to be framed. Therefore, the italic spaces 48 are respectively inserted after the character ⌈C⌋ which is positioned before the frame start point 46, after the character ⌈E⌋ which is positioned before the frame terminating point 47, after the character ⌈G⌋ which is positioned before the line changing code data and after the last italic character ⌈H⌋ which positioned before the non-italic character ⌈I⌋ next to the character ⌈H⌋.

A printed example which is printed according to the above explained in FIG. 13(c), is shown in FIG. 17(c). As is clear from FIG. 17(c), it could be understood that the suitable spaces are inserted before and after the frame lines.

As mentioned above, in the tape printer 1 of the first embodiment, since the suitable spaces are inserted before and after both the frame start point and the frame terminating point, when the print order is input by depressing the print key 3, the text having the frame enclosing the characters can be printed on the film tape 15 without contacting the characters with the frame lines. As a result, an extremely attractive tape T can be obtained on which the image of the characters and with the frame is printed so as to be easily readable.

In addition to the first embodiment, a detailed description according to the second preferred embodiment of the present invention will be given referring to FIGS. 14(A)–16(B) and FIGS. 18(A) and 18(B).

In FIGS. 14(A) and (B), it is judged in S71 whether key input from any key on the keyboard 6 is produced. If judged that the key input is produced (S71:YES), the procedure is shifted to S72. On the contrary, if judged that the key input is not produced (S71:NO), the procedure waits until a key input is produced. In S72, it is judged whether the key input is produced from a character key 2. If judged that the key input is produced from a character key 2 (S72:YES), the code data corresponding to the depressed character key 2 is successively stored in the text memory 41, thereby the text forming process is conducted (73). Thereafter the procedure returns to S71.

If judged that the key input is not produced from a character key 2 (S72:No), it is judged in S74 whether the key input is produced from the frame start key 4A. If judged that the key input is produced from the frame start key 4A (S74:YES), the frame embellishing process is conducted in S75, thereafter the procedure returns to S71.

Here, the frame embellishing process is done as follows. That is to say, after the cursor is moved to the character positioned at the left end of a character line, which is to be framed, by operating the cursor key K, the frame start key 4A is depressed. By this operation, the left end position of the frame is determined. Next, the cursor is moved to the character positioned at the right end of the character line, which is to be framed, by operating the cursor key K, thereafter the frame terminating key 4B is depressed. By this operation, the right end position of the frame is determined. After determining the area to be embellished by the frame through the above operation, the data corresponding to the area to be framed is stored into the text in the text memory 41 as a frame start code (corresponding to the left end of the frame) and a frame terminating code (corresponding to the right end of the frame). Here, the frame start code is inserted before the character code of the character positioned at the left end in the text memory 41 and a frame space code through which the frame space is formed is inserted between the character code and the frame start code data. Similarly to this, the frame terminating code data is inserted after the character code data of the character positioned at the right end in the text memory 41 and a frame space code data is inserted between the character code data and the frame terminating code data.

At the same time, on the liquid crystal display 7, a frame start mark is displayed before the character line which is to be framed and a frame terminating mark is displayed after such character line.

Further, if judged in S74 that the key input is not produced from the frame start key 4A (S74:NO), it is judged in S76 whether the key input is produced from the italic start key 4C. If judged that the key input is produced from the italic start key 4C (S76: YES), italic embellishing process is conducted in S77. After the italic embellishing process is conducted, the procedure returns to S71.

Here, the italic embellishing process is conducted as follows. That is to say, after the cursor is moved to the character positioned at the left end of a character line, which is to be italicized, by operating the cursor key K, the italic start key 4C is depressed. Next, the cursor is moved to the character positioned at the right end of the character line, which is to be italicized, by operating the cursor key K, thereafter the italic terminating key 4D is depressed. By this operation, the area to be italicized is determined. After determining the area to be italicized by the italic form through the above operation, on the liquid crystal display 7, an italic start mark, which indicates an italic start position, is displayed before the character line to be italicized and an italic terminating mark, which indicates an italic terminating position, is displayed after the character line to be italicized.

Further, attribute data, which shows that the italic embellishment is set, is added in the text memory 41 over from the code data of the character positioned at the left end of the character line to the code data of the character positioned at the right end of the character line. And an italic space code data through which an italic space is formed, is inserted both before the code data of the left end character and after the right end character.

In S76, if judged that the key input is not produced from the italic start key 4C (576:NO), it is judged in S78 whether the key input is produced from the just mode key 4E. If judged that the key input is produced from the just mode key 4E (S78:YES), just setting process is conducted in S79, thereafter the procedure returns to S71. Here, the just setting process is conducted by setting "ON" to the just flag 48.

In S78, if judged that the key input is not produced from the just mode key 4E (S78:NO), it is judged in S80 whether the key input is produced from the print key 3. If judged that the key input is produced from the print key 3 (S80:YES), the printing process (later mentioned) is conducted in S81, thereafter the procedure returns to S71.

Here, if judged that the key input is not produced from the print key 3 (S80:NO), process corresponding to the depressed key is conducted in S82, thereafter the procedure returns to S71.

Next, the printing process conducted in S81 will be described referring to FIGS. 15(A) and (B) and 16(A) and (B). After the print key 3 is depressed, the just preparing process is conducted in S90. First, the just preparing process will be described according to FIGS. 16(A) and (B).

In FIG. 16(A) and (B), the print length of each printing line (the printing line being marked off by the line change code) in the text stored in the text memory 41 is calculated in S110. Here, the print length is calculated as follows. Namely, at first, each character width (printing width of the character) data in the text data stored in the text memory 41 is read out from the CGROM 33, in which the character width data is stored for every character of the text. Further, with reference to the character code to which the attribute data is added when the italic embellishment is set, the italicized character width data is read out from the CGROM 33. Thereafter, the print length of each printing line is calculated by summing each character width data every printing line. The thus calculated print length is stored in the RAM 34. At that time, the point value of the character code data positioned at the line head of each printing line is stored in the RAM 34.

In S111, the character number in each printing line is calculated by omitting the frame space code data and the italic space code data and the calculated character number is stored in the RAM 34. Here, both the frame space code data and the italic space code data are generally processed as the same as the character code data so as to simplify the control procedure of the tape printer 1. In this case, if the normal process of the frame or the italic embellishment is conducted, unnecessary long space is formed at the position where the frame space code data or the italic space code data lies. In order to avoid that such unnecessary long space is formed, both the frame space code data and the italic space code data are omitted in calculating the character number of each printing line.

Next, in S112, the longest printing line is detected among the printing lines and the difference of the print length from the longest printing line is obtained for each printing line by subtracting the print length of each printing line from the length of the longest printing line. Here, the print length of each printing line includes the frame space or the italic space. The above obtained difference is the space amount (in which the frame space or the italic space is not included) in each printing line.

In S113, the obtained difference between the longest printing line and each printing line is divided by the number calculated by subtracting "1" from the character number obtained in S111. As a result, the just space is obtained. Here, such number means the space number which is to be inserted between the characters and therefore, the characters are arranged with the same space in each printing line by inserting the just space between the characters. The thus obtained just space is stored in the just space memory 46 in accordance with each printing line.

Further, in S114, the position data of the character arranged in the print buffer 45 at the head position of each printing line is calculated so that the head character in each printing line is arranged at the same position as the head character of the longest printing line when the just mode function is executed. The thus calculated position data of the head character is stored in the position memory 47. Thereafter, the just preparing process is finished.

Continuing to explain the printing process according to FIGS. 15(A) and (B), after the just-preparing process, the pointer value P of the text pointer 42 is set to the head address of the text in the text memory 41 in S91. Here, in each printing line after the second printing line, the pointer value P of the text pointer 42 is set to a position after line change code inserted the end position of the previous printing line. In S92, it is judged whether the pointer value P coincides with the position data of the head character in the pointed printing line. If judged that the pointer value P coincides with the point value, which indicates the head character, stored in the RAM 34 (S92:YES), the just space of the present printing line stored in the just space memory 46 is read out therefrom in S93. In S94, the position data of the head character in each printing line is read out from the position memory 47, thereafter the procedure is shifted to S95. Here, if judged that the pointer value P does not coincide with the position data of the head character (S92:NO), the procedure is directly shifted to S95.

In S95, the character code data pointed by the pointer value P of the text pointer 42 is read out from the text memory 41 and the dot pattern data corresponding to such character data is read out from the CGROM 33. In S96, the dot pattern data is transmitted to the image buffer 43, thereafter the dot pattern data is transmitted to the embellishing buffer 44. The dot pattern data further transmitted to the print buffer 45 from the embellishing buffer 44. Here, with reference to the character code which is not italicized, the dot pattern data thereof transmitted to the embellishing buffer 44 is transmitted to the print buffer 45 according to the position data stored in the RAM 34.

On the other hand, as concerns the character data to which the attribute data is added when the italic embellishment is set, the dot pattern data is embellished into the italic data on the embellishing buffer 44 by inclining the dot pattern data with predetermined angle. Thereafter, the italic data is arranged on the print buffer 45 according to the position data stored in the position memory 47.

In S97, it is judged whether the just flag 48 is set to "ON". If judged that the just flag 48 is set to "ON" (S97:YES), the arranging position of the character next the pointed character by the text pointer 42 is set to the position which is advanced by the just space read out from the just space memory 46 in S93 (S98). The thus set arranging position is stored in the RAM 34. Thereafter the procedure is shifted to S99. On the contrary, if judged that the just flag 48 is not set to "ON" (S97:NO), the procedure is directly shifted to S99.

In S99, it is judged whether the pointer value P of the text pointer 42 points the last position of the text in the text memory 41. If judged that the pointer value P points the last position (S99:YES), the dot pattern data stored in the print buffer 45 is printed on the film tape 15 through the thermal head 11.

Figures 18A, 18B:
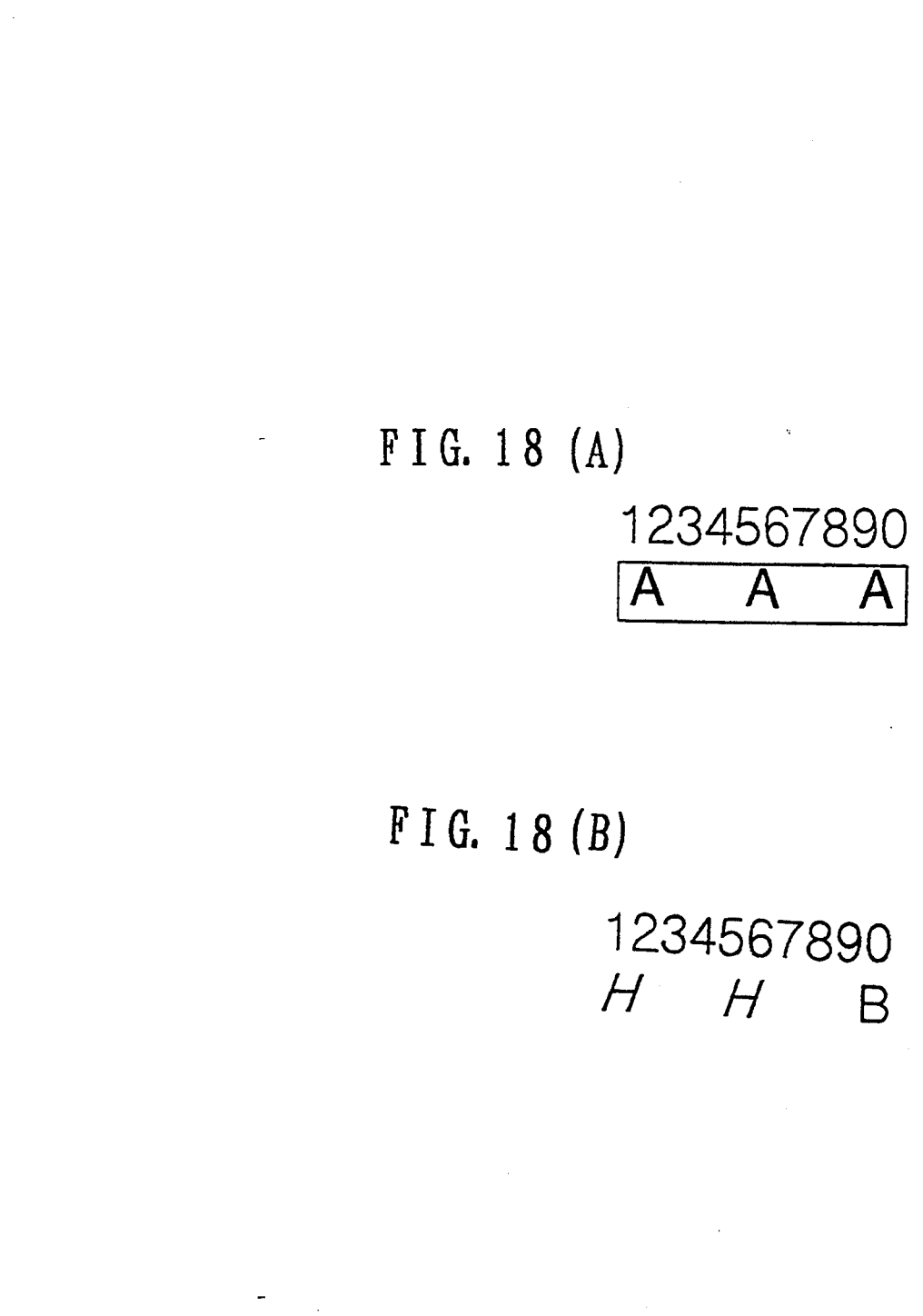

Here, the printed sample in which the characters with the frame embellishment are printed while the above just process is conducted, is shown in FIG. 18 (A). The another printed sample in which the characters with the italic embellishment are printed while the above just process is conducted, is shown in FIG. 18(B). Since both the frame space and the italic space, which are inserted when the frame embellishment or the italic embellishment are conducted, are omitted according to the above just process, even the characters with the frame or the italic embellishment can be arranged with the suitable just space between the adjacent characters, as shown in FIGS. 18(A) and (B).

On the other hand, if judged that the pointer value P does not point the last position (S99:NO), the pointer value P of the text memory 41 is counted up by "1" so as to conduct the above process of the next character. Thereafter, the procedure returns to S92.

As mentioned above, in the tape printer 1 of the second embodiment, when the just process of the characters with the frame embellishment or the italic embellishment is conducted, not only the difference of the printing length between the longest printing line and each printing line is calculated, but also the just space is calculated by dividing the above difference by the number obtained through subtracting "1" from the character number calculated while omitting the frame space and the italic space. Thereafter, the characters with the frame embellishment and the italic embellishment are arranged with the same space between the adjacent characters, according to the just space. As a result, the just process can be suitably conducted without inserting the unnecessary long space at both ends of the embellished characters or between the embellished characters. Therefore, it can be obtained the extremely attractive tape T on which the readable characters are printed, even in case that the just process of the characters with the frame embellishment or the italic embellishment is conducted.

While the invention has been particularly shown and described with reference to preferred embodiments thereof, it will be understood by those skilled in the art that the foregoing and other changes in form and details can be made therein without departing from the spirit and scope of the invention.

For example, though the just process is conducted after the characters or the printing lines to be embellished with the frame or the italic are determined by operating the cursor key K, it is conceivable that the just process can be done even if the characters are printed on the tape T, printing length of which is determined.

What is claimed is:

1. A printer capable of printing characters within a frame, the printer comprising:
   character data input means for inputting character code data of the characters over plural lines,
   memory means for storing the character code data input from the character data input means,
   inserting means for inserting frame start code data and frame terminating code data in the memory means,
   frame space forming means for forming frame spaces according to the frame start code data and the frame terminating code data,
   setting means for setting a frame start point to the frame space formed according to the frame start code data and a frame terminating point to the frame space formed according to the frame terminating code data,
   first judging means for judging whether both the frame start point and the frame terminating point exist in the same line, wherein the frame space forming means inserts the frame spaces before and after both the frame start code data and the frame terminating code data if judged by the first judging means that both the frame start point and the frame terminating point exist in the same line,
   preparing means for preparing image data of the characters based on the character code data and image data of the frame based on both the frame start point and the frame terminating point, the image data of the characters prepared so as to be positioned in an inside area surrounded by the image data of the frame and the preparing means preparing the image data of the frame so that the frame spaces formed by the frame space forming means are positioned in the inside area,
   image buffer for storing the image data prepared by the preparing means, and
   print means for printing the image data on a print medium.

2. The printer according to claim 1, wherein the setting means sets the frame start point to the frame space inserted after the frame start code data and sets the frame terminating point to the frame space inserted before the frame terminating code data.

3. The printer according to claim 1, further comprising second judging means for judging whether both the frame start point and the frame terminating point exist in a block including one or more lines and pointer means for successively pointing each line in the block, wherein the frame space forming means inserts the frame spaces at both a head position and an end position of the line pointed by the pointer means if judged by the second judging means that both the frame start point and the frame terminating point exist in the block.

4. The printer according to claim 3, wherein the setting means sets the frame start point to the frame space inserted at the head position of the line where the frame start code data exists and sets the frame terminating point to the frame space inserted at the end position of the line where the frame terminating code data exists.

5. The printer according to claim 3, wherein the preparing means prepares the image data of the character code data and the frame data for each block.

6. The printer according to claim 1, further comprising italic data input means for inputting italic start code data and italic terminating code data and embellishing means for italicizing the characters corresponding to the character code data which exists between the italic start code data and the italic terminating code data.

7. The printer according to claim 6, further comprising italic space forming means for forming an italic space before the italic terminating code data.

8. The printer according to claim 7, wherein the italic space forming means forms an italic space before the frame start code data inserted by the inserting means.

9. The printer according to claim 1, further comprising back up means for backing up the character code data stored in the memory means before the frame spaces are formed by the frame space forming means and restoration means for restoring the character code data backed up by the back up means after the image data is printed on the print medium by the print means.

10. The printer according to claim 7, further comprising just mode setting means for setting just mode in which the characters embellished by one of the frame or the italic form are arranged with an equal space between the adjacent characters, detection means for detecting the longest line with a length among the plural lines, each line having a length shorter than the length of the longest line, input by the character data input means, calculation means for calculating a just space when the just mode is set by the just mode setting means, the just space being calculated by dividing difference between the length of the longest line and the length of the line in which the embellished characters exist by a number which is obtained through subtracting 1 from a number of the embellished characters counted while omitting the frame space formed by the frame space forming means or the italic space formed by the italic space forming means, and arrangement means for arranging the embellished characters within the line while inserting the just space between the adjacent characters.

11. A tape printer capable of printing characters within a frame, the tape printer comprising:

character data input means for inputting character code data of the characters over plural lines, memory means for storing the character code data input from the character data input means, inserting means for inserting frame start code data and frame terminating code data in the memory means, frame space forming means for forming frame spaces according to the frame start code data and the frame terminating code data, setting means for setting a frame start point to the frame space formed according to the frame start code data and a frame terminating point to the frame space formed according to the frame terminating code data, italic data input means for inputting italic start code data and italic terminating code data and embellishing means for italicizing the characters corresponding to the character code data which exists between the italic start code data and the italic terminating code data, italic space forming means for forming an italic space before the italic terminating code data, just mode setting means for setting just mode in which the characters embellished by one of the frame or the italic form are arranged with an equal space between the adjacent characters, detection means for detecting the longest line with a length among the plural lines, each line having a length shorter than the length of the longest line, input by the character data input means, calculation means for calculating a just space when the just mode is set by the just mode setting means, the just space being calculated by dividing difference between the length of the longest line and the length of the line in which the embellished characters exist by a number which is obtained through subtracting 1 from a number of the embellished characters counted while omitting the frame space formed by the frame space forming means or the italic space formed by the italic space forming means, arrangement means for arranging the embellished characters within the line while inserting the just space between the adjacent characters, preparing means for preparing image dale of the characters based on the character code data and image data of the frame based on both the frame start point and the frame terminating point, the image data of the frame forming an inside area that is surrounded by the frame, said image data of said characters positioned in the inside area, and the preparing means preparing the image data of the frame so that the frame spaces formed by the frame space forming means are positioned in the inside area, image buffer for storing the image data prepared by the preparing means, and print means for printing the image data on a tape.

12. A printer with a just mode in which characters are arranged with an equal space between the adjacent characters, the printer comprising:

character data input means for inputting character code data of the characters over plural lines, instruction means for instructing embellishment of the characters every the line or the character among the characters input over the plural lines by the character input means, embellishment means for embellishing the characters instructed by the instruction means while inserting an embellishing space between the adjacent characters, print means for printing the characters embellished by the embellishment means on a print medium, just mode setting means for setting the just mode, detection means for detecting the longest line with a length among the plural lines, each line having a length shorter than the length of the longest line, input by the character data input means, calculation means for calculating a just space when the just mode is set by the just mode setting means, the just space being calculated by dividing difference between the length of the longest line and the length of the line in which the embellished characters exist by a number which is obtained through subtracting 1 from a number of the embellished characters counted while omitting the embellishing space inserted by the embellishment means, and arrangement means for arranging the embellished characters within the line while inserting the just space between the adjacent characters.

13. The printer according to claim 12, wherein the embellishment means embellishes the characters through a frame which encloses the characters.

14. The printer according to claim 12, wherein the embellishment means embellishes the characters through an italic form in which the characters are inclined by a predetermined angle.

* * * * *